Patented Nov. 4, 1930

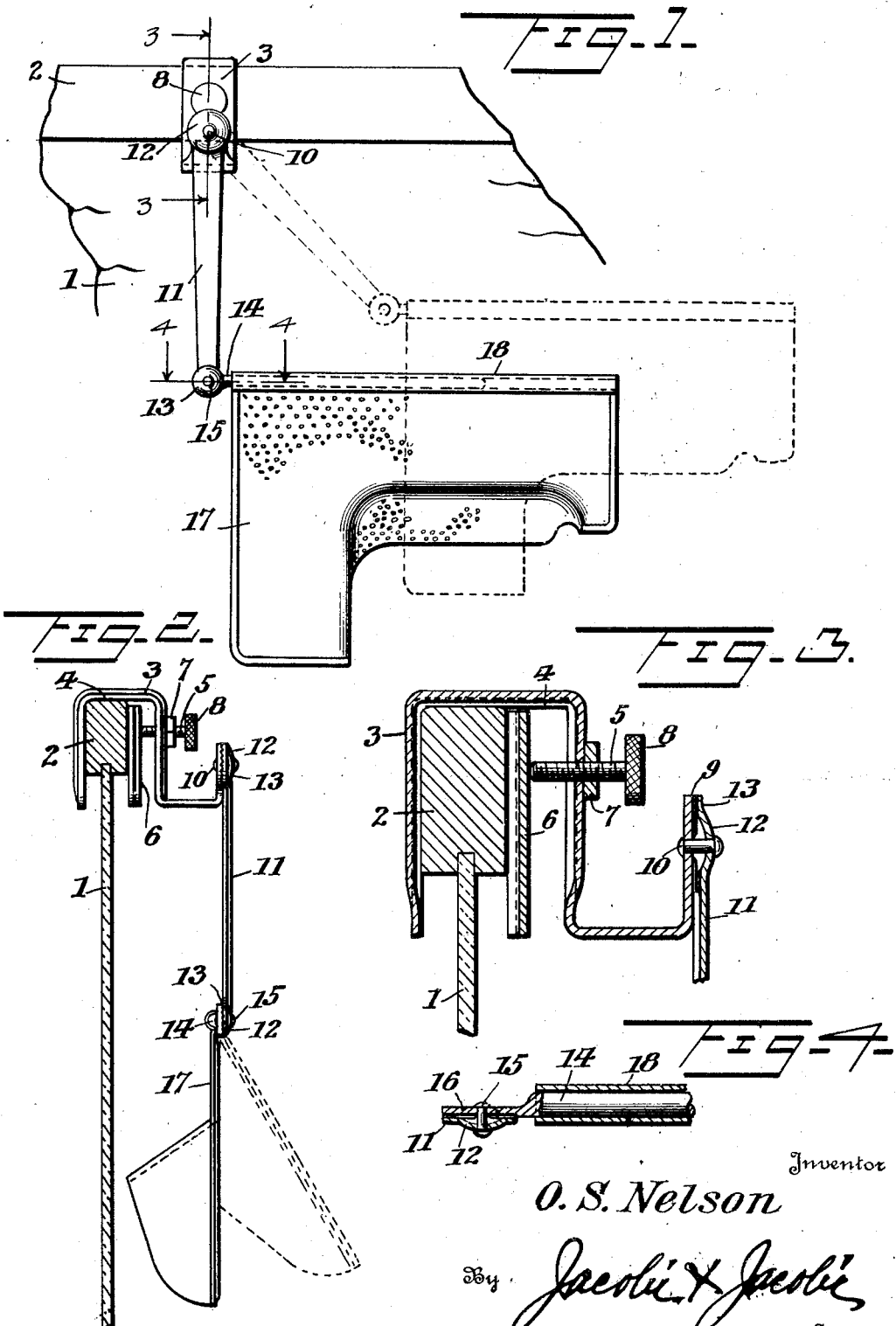

1,780,400

UNITED STATES PATENT OFFICE

OTTO S. NELSON, OF MITCHELL, SOUTH DAKOTA, ASSIGNOR TO FACE-A-LITE MANUFACTURING COMPANY, OF MITCHELL, SOUTH DAKOTA

GLARE-SHIELD HOLDER

Application filed November 9, 1927. Serial No. 232,064.

This invention relates to a glare shield holder especially adapted to be used upon and applied to the frame of a windshield of an automobile, and it consists in the novel features hereinafter described and claimed.

An object of the invention is to provide a holder of the character indicated which is of simple and durable structure and which may be easily and quickly applied to the frame of the windshield or removed therefrom, the structure having its parts so arranged and assembled that the shield may be adjusted to any desired vertical position with relation to the windshield and the shield may be tilted or set at any desired angle with relation to the plane of the windshield.

With this object in view, the structure includes a bracket member which is substantially S-shaped in edge elevation, one end portion being adjusted to receive the frame of the windshield and the intermediate portion being provided with a clamp for holding the bracket in position upon the windshield frame. An arm is pivotally connected with the other end of the bracket and may swing in a plane parallel with the plane of the windshield glass. The pivotal connection between the arm and the bracket is sufficiently tight to hold the arm at any position to which it is formed with relation to the bracket. A rod is pivotally connected with the free end of the arm and the pivotal connection between the rod and the arm is sufficiently tight to hold the parts set at the relative positions to which the same may be adjusted. The shield proper is provided at its upper edge with a cylindrical curl which is adapted to snugly receive the said rod whereby the shield proper may be held at a desired angle with relation to the plane of the wind shield.

In the accompanying drawing:

Figure 1 is a fragmentary side elevational view of a wind shield, with the glare shield holder and glare shield applied thereto.

Figure 2 is a transverse sectional view of the wind shield, showing the glare shield holder and glare shield in edge elevation.

Figure 3 is a fragmentary transverse sectional view cut on the line 3—3 of Figure 1.

Figure 4 is a fragmentary horizontal sectional view, cut on the line 4—4 of Figure 1.

In the drawing, a portion of the windshield glass is shown at 1, and a portion of the frame therefor, is shown at 2. The glare shield holder comprises a bracket 3 which is formed from sheet metal and which is substantially S-shaped in edge elevation. One end portion of the bracket 3 is provided at its opposite edges with inwardly disposed flanges 4 which add rigidity to the bracket and also add the edges of portions of the flanges which are adapted to bite into the surface of the frame 2, when the bracket is applied, thus providing the end portions for securely holding the bracket in position upon the frame. A screw bolt 5 is suspended through the immediate portion of the bracket and bears at its inner end against a plate 6 which is concave transversely and having its side edges bearing against the side of the frame when the device is applied. A jam nut 7 is threaded upon the intermediate portion of the screw 5 and is adapted to bear against the outer surface of the intermediate portion of the bracket and serves as means for holding the screw 5 at a set position in the bracket. The screw 5 is provided at its outer end with a knurled head 8. The outer surface of the inner end of the bracket 3 is provided with a series of radially disposed ribs 9 which radiate from an opening provided in the bracket which receives a rivet 10. An arm 11 is provided at its ends with convexities 12 having at their inner sides ribs 13 and the rivet 10 passes through one of the convexities of the arm 11 and holds the adjacent ribs 13 in frictional contact with the ribs 9. The intermediate portion of the arm 11 is concaved transversely in order to render the said arm rigid.

A rod 14 is flattened at one end as at 16 and the said flattened portion is secured by means of a rivet 15 to the center of the convexity 12 at the free end of the arm 11, as best shown in Figure 4 of the drawing. The glare shield at 17 is provided at its upper edge with a cylindrical curl 18 which snugly receives the rod 14 and whereby the glare shield is frictionally held upon the rod and may be turned with relation to the axis of the rod and is held at any desired angle with relation to the plane of the windshield.

The arm 11 may be swung to any desired position in a plane parallel with the plane of the windshield and is frictionally held at such position by the engagement of the ribs 13 with the ribs 9. The rod 14 may be swung to any desired position in a plane with relation to the plane of the windshield and is held by the frictional contact between the ribs 13 at the free end of the arm and the flattened end portion 16 of the rod. The glare shield 17 may be swung to any desired position around the axis of the rod 14 and disposed at any desired angle with relation to the windshield and if desired, the curl 18 and the glare shield may be removed from the end of the rod.

From the above description taken in conjunction with the accompanying drawing, it will be seen that a glare shield holder of simple and durable construction is provided and the glare shield holder may be easily and quickly applied to the frame of a windshield or removed therefrom, and that the parts may be adjusted so that the glare shield is held in a desired elevation and may be swung or turned and held in a desired angle with relation to the plane of the windshield.

From the foregoing description of the construction of my improved device, it will be seen that I have provided a simple, inexpensive and efficient means for carrying out the objects of my invention and while I have particularly described the elements best adapted to perform the functions set forth, it is obvious that various changes in form, proportion and in the minor details of construction may be resorted to without departing from the spirit or sacrificing any of the principles of the invention.

Having described my invention, what I claim is:

1. A glare shield holder comprising a bracket member formed from a single strip of metal bent to provide spaced intermediate and opposite end portions lying in parallel planes, a screw passing transversely through the intermediate portion and disposed between the end portions, an arm pivoted to one end portion and adapted to be swung in a plane parallel with the end portions and the intermediate portion of the bracket member, a rod pivoted to the arm and adapted to be swung in a plane parallel with the end portions and intermediate portion of the bracket, and a shield mounted for turning movement upon the rod and adapted to be swung transversely of the end portions and intermediate portion of the brackets.

2. A glare shield holder comprising a bracket formed of a single strip of metal bent in substantially S-shaped formation to provide oppositely directed end portions and an intermediate portion lying in vertical parallel planes, the one end portion being of less height than the intermediate and opposite end portions, a screw passing transversely through the intermediate portion in a plane above the plane of the upper end of the first mentioned end portion and disposed between both end portions, an arm pivoted at its inner end to the first mentioned end portion of the bracket and adapted to be swung in a plane parallel with the end and intermediate portions, means for frictionally retaining said arm in various adjusted positions with respect to the bracket, a rod pivoted at one end to the outer end of said arm and adapted to be swung in a plane parallel with the end and intermediate portions of the bracket, means for frictionally retaining said rod in various adjusted positions with respect to said arm, and a shield mounted for turning movement upon said rod and adapted to swing transversely of the end and intermediate portions of said bracket, said shield having frictional contact with said rod and slidable axially of the latter to be adjusted, applied or removed.

In testimony whereof I affix my signature.

OTTO S. NELSON.